Feb. 28, 1956 W. F. SHERMAN 2,736,587
SANDING DEVICES FOR MOTOR VEHICLES
Filed Nov. 9, 1951 2 Sheets-Sheet 1
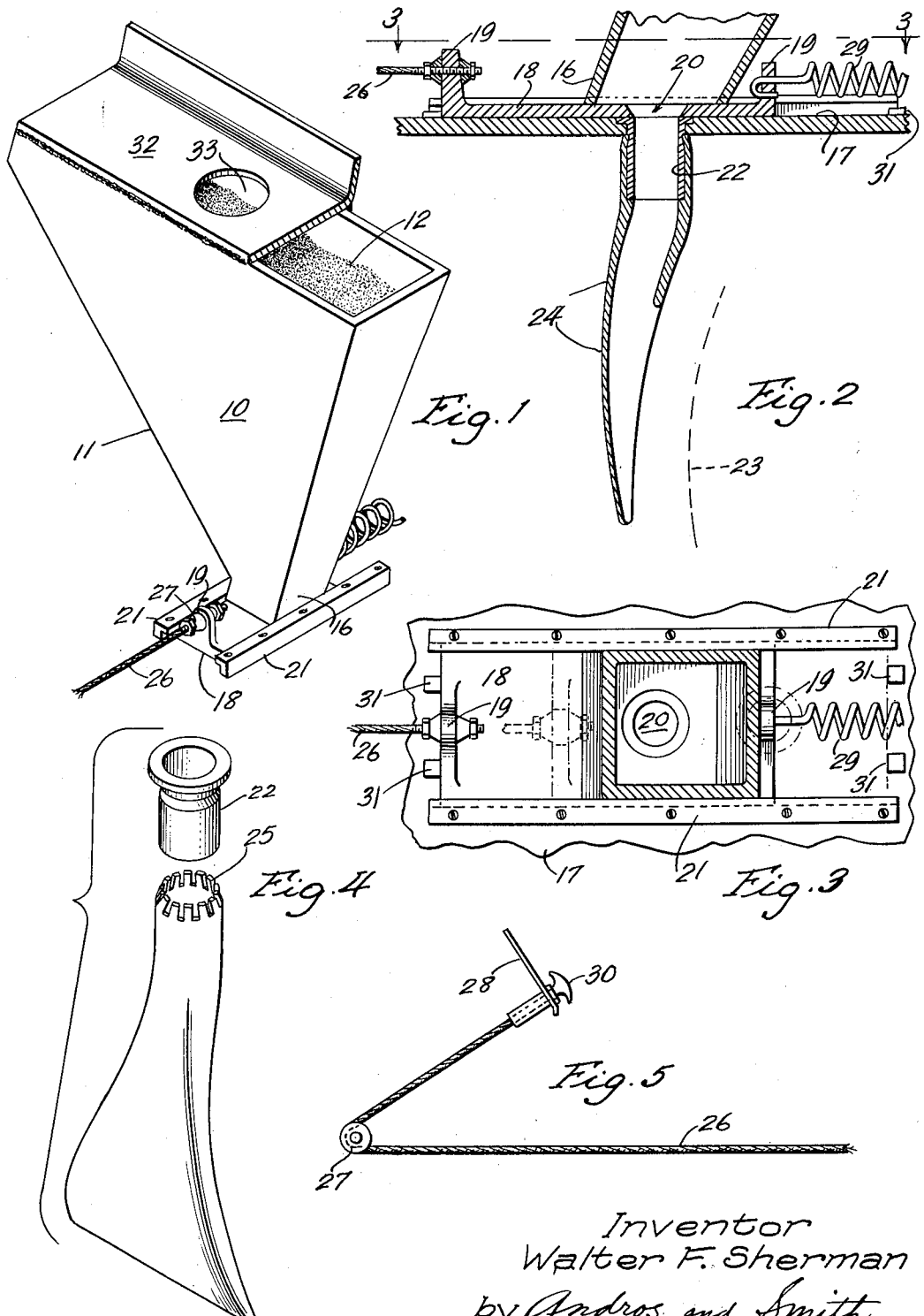
Inventor
Walter F. Sherman
by Andros and Smith
His Attorneys Feb. 28, 1956  W. F. SHERMAN  2,736,587
SANDING DEVICES FOR MOTOR VEHICLES
Filed Nov. 9, 1951  2 Sheets-Sheet 2

Inventor
Walter F. Sherman
by Andros and Smith
His Attorneys

United States Patent Office 2,736,587
Patented Feb. 28, 1956

2,736,587

SANDING DEVICES FOR MOTOR VEHICLES

Walter F. Sherman, Elsmere, N. Y.

Application November 9, 1951, Serial No. 255,639

2 Claims. (Cl. 291—34)

This invention relates to sanding devices for motor vehicles, having particular reference to such devices for use preferably in passenger automobiles, the actuatable operating portions thereof being wholly within the confines of the vehicle, and the provision of such devices is a principal object of the invention.

Generally, it is an object of the invention to provide such a device which is economical of manufacture, simple yet sturdy and durable of construction, positive in operation, and relatively free from wear and tear and other mechanical difficulties.

More specifically, it is an object of the invention to provide such a sanding device having a hopper with slanting sides forming a funnel-shaped outlet with sand to be expelled therefrom by gravity, the hopper being adapted for use behind the seat in the trunk of the car, with the outlet closely adjacent the inside floor surface, a nozzle adapted to be secured to the floor of the vehicle directly underneath the outlet to spread sand in the path of the wheel, or wheels, a gate valve, having an opening approximately the inlet size of the nozzle, which gate is movably mounted between the upper floor surface and the hopper, in frictional engagement with both, and reciprocating means, wholly within the confines of the vehicle, to reciprocate the gate valve to bring the opening therein into and out of registry with the nozzle.

Other specific objects of the invention are to provide such a device in which the gate valve comprises a horizontally reciprocable plate; and which retaining members in abutting relation to the plate are utilized to maintain the opening therein in aligned relation to the nozzle opening when operating the plate in which said reciprocating means comprises a spring member to retract the gate valve or plate to inoperative position; and actuating means, convenient to the control of the driver to actuate the gate valve.

Another object of the invention is the provision of such a sanding device having a pivotally mounted gate valve with actuating mechanism similar to that above described.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a perspective view of one form of sanding device and gate valve embodying the invention;

Fig. 2 is a vertical sectional view through the lower part of the hopper, gate valve and nozzle;

Fig. 3 is a plan view of the valve gate taken through a horizontal section of the hopper along the lines 3—3 of Fig. 2 and looking in the direction of the arrows;

Fig. 4 is an exploded perspective view of a preferred type of removably attachable nozzle and nipple;

Fig. 5 is an actuating means for operating the valve gate;

Figure 6:
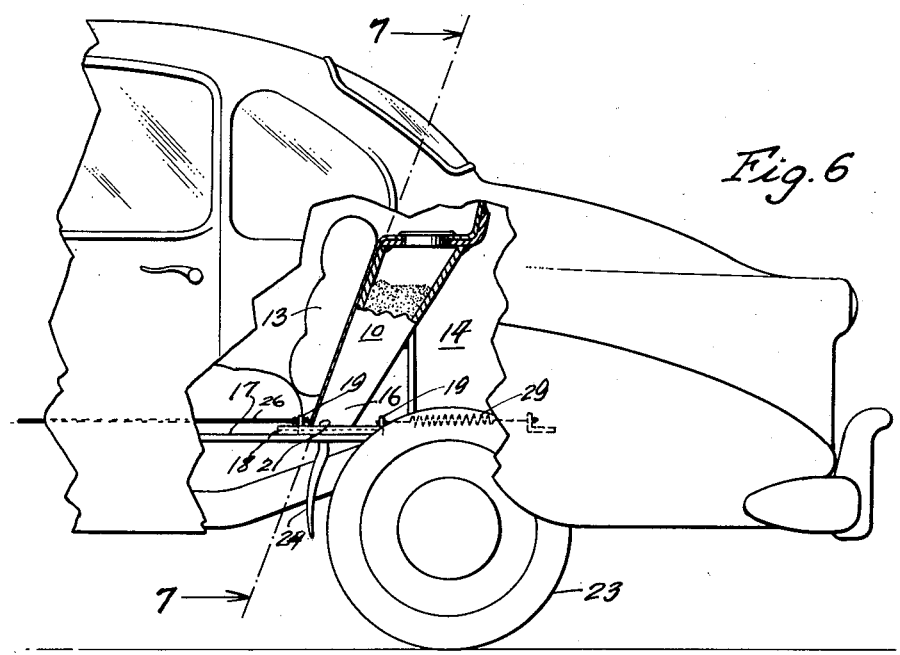
Fig. 6 is an end elevational view, partly in section and with parts broken away, of a hopper of the type above illustrated depicted in position in the rear portion of a passenger automobile.
Figure 7:
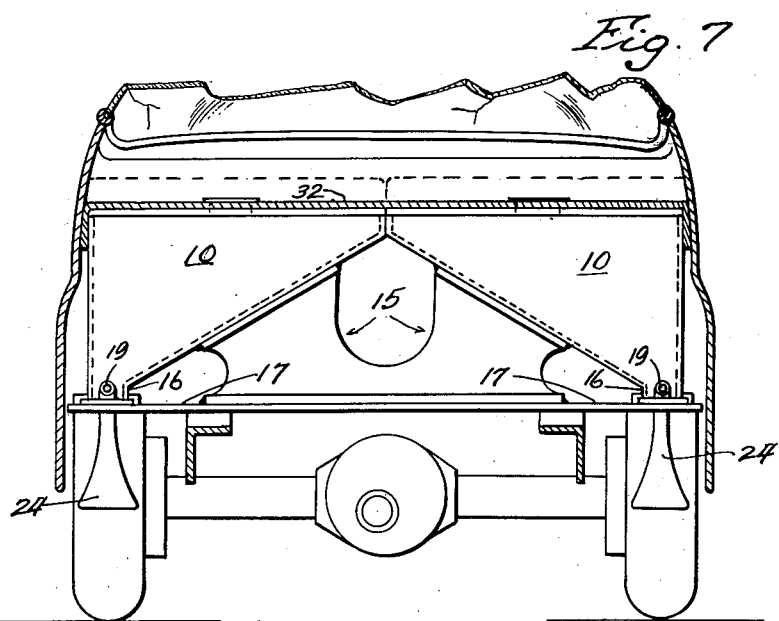
Fig. 7 is a transverse sectional view taken along the lines 7—7 of Fig. 6 and looking in the direction of the arrows.

Referring more particularly to the drawings, there is illustrated a hopper, or section of a sand containing dual-type hopper 10 having at least one slanting side wall 11 to provide a funnel-shaped outlet for the sand 12 therein, to be expelled by gravity. The other part of the hopper is similar in arrangement and the description thereof need not be repeated. However, it will be understood that two separate hoppers of this general type can be utilized or a single hopper of the general shape as illustrated in Fig. 7. This hopper, or hoppers, preferably is positioned behind the seat 13 in a passenger vehicle in the forward section of the trunk 14. It may be suitably supported in position by means of a bridge, for example, such as that indicated generally at 15.

It will be observed that the constricted portion, or outlet 16 at the bottom thereof is spaced in closely adjacent position to the upper or inside surface of the floor 17. Immediately beneath the hopper, and in frictional engagement therewith as well as with the floor is a gate valve 18 which preferably comprises a plate having upstanding lugs 19. The gate valve 18 has an opening therethrough, preferably tapered as indicated at 20. Adjacent each side of the gate as well as the hopper are spaced-apart retaining members preferably in the form of angle irons 21 adapted to be secured to the inside floor surface of the vehicle. These retaining members will hold the gate valve, or plate, in aligned position when the same is reciprocated in opening and closing the same.

Flush with the floor surface and approximately centrally of the outlet portion 16 of the hopper 10 is a nipple 22 which may extend downwardly to a position adjacent a wheel 23 in order to spread sand in the path of the advancing wheel. However, I prefer to use a detachable type of spreading nozzle 24 which is suitably slit as at 25 around its narrow marginal peripheral edge so that the same can be made frictionally to be positioned onto the nipple 22. This permits ready removal when the device is not needed during certain seasons of the year, and it will be observed that this is the only portion of the device, outside of the nipple, which projects out of the confines of the vehicle. Therefore, there is little danger of slush, snow, mud, ice and the like jamming the movable members entering into the combination and, in particular, the actuating linkage about to be described. This preferably comprises a flexible cable 26 which is secured, by means of a connecting member 27, to the lug 19 on the valve gate 18. This cable preferably extends along the upper or inside floor of the car and may be concealed. In any event, it can be passed around a pulley, or other suitable element 27 underneath the dash board 28.

At the other end of the plate or gate valve 18 there is connected to the opposite lug or spring 29 which in turn is suitably connected to any portion of the floor board so that when the operating handle 30 at the end of the cable 26 is released, the gate valve will be returned to its initial position at which time the opening 20 in the gate valve will be out of registry with the outlet opening in the nozzle 21. A suitable stop, or stops, 31 may be provided to prevent the gate being pulled backwardly a distance further than necessary.

A suitable cover 32 may be used on top of the hopper 10 and this may be welded or otherwise held in position, if desirable. In this case an opening 33 may be shown in each hopper 10 and the same may be provided with a removable cover when it is desired to refill the hopper with dry sand. It will be understood that the entire cover 32 can be made without the opening 33 and the same hinged in position or otherwise completely removable.

Figure 1A:
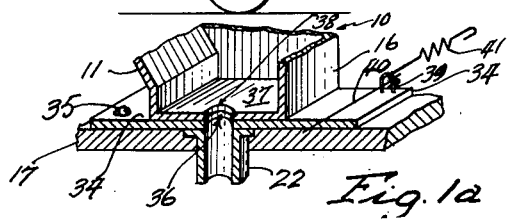
Fig. 1a is a fragmentary perspective view, partly in section, of a modified form of gate valve for such a device.

In the specification shown in Fig. 1a there is disclosed a valve gate which constitutes a suitable flat plate 34 pivotally mounted as at 35 and having an opening 36 therein of the same approximate size as that shown at 20 in the reciprocating type of valve plate member. Preferably, also, the hopper 16 is illustrated as having a closed bottom 37 except for an opening 38 substantially centrally thereof and which is in coaxial alignment with the opening in the nozzle. With this type of arrangement sand cannot escape from between the walls of the outlet portion 16 of the hopper until the openings 36 and 38 are in registry with the outlet of the nipple 22. At the other opening end of the valve gate, or plate, 34 there is provided an upstanding lug 39 and this has connected to it an actuating wire or cable 40 and a retracting spring 41 for the same purpose as described above in connection with the cable 26 and spring 29.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a sanding device mounted within the trunk of an automobile, the improvement comprising a hopper for holding a quantity of sand and having an outlet portion for said sand; bridge means connected to the floor of the car to support said hopper and outlet portion above, but closely adjacent the inside floor surface of said trunk; an outlet nozzle for said sand having a shoulder thereon secured flush with the inside floor surface of said trunk in a recess provided for said shoulder and to extend a substantial distance beneath the bottom of said floor exterior of said automobile; a fan-shaped sand spreader removably mounted on said nozzle to spread sand underneath, toward and transversely of the path of the advancing wheel of said automobile; a flat gate valve having an opening therein approximately the diameter of said nozzle, said flat gate valve being movably mounted to reciprocate between said inside floor surface and nozzle, and the bottom of said outlet portion of said hopper, and in frictional engagement therewith, and with said floor surface; spaced-apart aligning and retaining tracks for said gate secured to said floor surface; said hopper, supporting means, tracks and flat gate valve being mounted wholly within the confines of said trunk; and manual means to reciprocate said flat gate valve to bring the opening therein into and out of registry with said nozzle, said last named means being mounted within the confines of said automobile, to protect the same against ice, slush and snow, which would otherwise prevent proper operation of said device.

2. The combination with an automobile of a sanding device in the trunk of said automobile, said device comprising a hopper for holding a quantity of sand and having an outlet portion for said sand; bridge means connected to the floor of said car securing said hopper in said trunk with said outlet portion spaced above but closely adjacent the inside floor surface of said trunk; an outlet nozzle for said sand having a shoulder thereon secured to said floor surface in a recess provided for said shoulder underneath said outlet portion of the hopper and also in spaced relation thereto; a fan-shaped sand spreader removably mounted on said nozzle to spread sand underneath, toward and transversely of the path of the advancing wheel of said automobile; a flat plate gate valve, having an opening therein approximately the diameter of said nozzle mounted to reciprocate between the outlet portion of said floor and hopper and in frictional engagement therewith, and with said floor surface; spaced-apart aligning and retaining tracks for said gate secured to said floor surface; a spring secured at one end to said flat plate gate valve and to the inside floor surface at its other end normally to hold the opening in said gate out of registry with said nozzle to prevent the escape of sand; a flexible cable attached to the opposite end of said flat gate valve and extending along the inside floor surface of said automobile within reach of the operator thereof manually to actuate said valve and bring the opening therein into registry with said nozzle to permit sand to escape therefrom in the path of the rear wheels of said automobile; said gate, tracks, spring and cable all being confined, together with the entire hopper, within the confines of said automobile, to protect the same against ice, slush and snow to insure proper operation of said device.

References Cited in the file of this patent

UNITED STATES PATENTS

| Number | Name | Date |
|---|---|---|
| Re. 20,905 | Swan | Nov. 1, 1938 |
| 209,196 | Shaw | Oct. 22, 1878 |
| 535,479 | Baumann et al. | Mar. 12, 1895 |
| 746,691 | Gardner | Dec. 15, 1903 |
| 1,353,560 | Beil | Sept. 21, 1920 |
| 1,491,199 | Chapman | Apr. 22, 1924 |
| 1,501,650 | Dienstback et al. | July 15, 1924 |
| 1,527,789 | Johnson | Feb. 3, 1925 |
| 1,575,098 | Conty | Mar. 2, 1926 |
| 1,622,165 | Robinson | Mar. 22, 1927 |
| 1,832,581 | Riley | Nov. 17, 1931 |
| 1,888,006 | Marryatt et al. | Nov. 15, 1932 |
| 2,244,069 | Kook et al. | June 3, 1941 |
| 2,507,738 | Spatz | May 16, 1950 |